(12) United States Patent
Mettem et al.

(10) Patent No.: US 12,320,420 B2
(45) Date of Patent: Jun. 3, 2025

(54) GEAR MOTOR WITH GEARHEAD OUTPUT SHAFT POSITION FEEDBACK SYSTEM

(71) Applicant: American Precision Industries, Inc., West Chester, PA (US)

(72) Inventors: Navadeep Mettem, Downingtown, PA (US); Andrew Sharp, Ardmore, PA (US); Jonathan Culp, Kennett Square, PA (US)

(73) Assignee: American Precision Industries, Inc., West Chester, PA (US)

( * ) Notice: Subject to any disclaimer, the term of this patent is extended or adjusted under 35 U.S.C. 154(b) by 0 days.

(21) Appl. No.: 18/539,397

(22) Filed: Dec. 14, 2023

(65) Prior Publication Data

US 2024/0200651 A1 Jun. 20, 2024

Related U.S. Application Data

(60) Provisional application No. 63/387,973, filed on Dec. 19, 2022.

(51) Int. Cl.
*F16H 57/021* (2012.01)
*F16H 1/28* (2006.01)
(Continued)

(52) U.S. Cl.
CPC ............ *F16H 61/0202* (2013.01); *F16H 1/28* (2013.01); *F16H 57/021* (2013.01); *H02K 7/083* (2013.01);
(Continued)

(58) Field of Classification Search
CPC ...... F16H 61/0202; F16H 1/28; F16H 57/021; H02K 7/083; H02K 7/116; H02K 11/215; H02K 21/14; H02K 2207/03; H02K 7/003

See application file for complete search history.

(56) References Cited

U.S. PATENT DOCUMENTS

| 6,258,007 B1 | 7/2001 | Kristjansson |
| 6,791,219 B1 * | 9/2004 | Eric ................... H02K 11/215 310/68 B |

(Continued)

FOREIGN PATENT DOCUMENTS

EP 1489735 A2 12/2004

OTHER PUBLICATIONS

Extended European Search Report issued in corresponding European Patent Application No. 23216165.3 (May 23, 2024).

*Primary Examiner* — Tisha D Lewis
(74) *Attorney, Agent, or Firm* — Reising Ethington P.C.

(57) ABSTRACT

A gear motor includes a motor having a housing with first and second endbells and a wall extending therebetween defining a housing interior and a stator and a rotor disposed within the housing interior. The rotor defines a tubular motor shaft extending through the first endbell. A gearhead is driven by the motor shaft and defines a gearhead output shaft coaxial with the motor shaft. A rod has a first end coupled to the gearhead output shaft and extends through a bore in the motor shaft. A magnetized disc is coupled to a second end of the rod and is disposed within the housing interior. A position sensor disposed outside of the housing interior generates signals responsive to rotation of the magnetized disc. The motor and gearhead output shafts may be supported on aligned bearings in the second endbell.

25 Claims, 3 Drawing Sheets

(51) Int. Cl.
    *F16H 61/02*     (2006.01)
    *H02K 7/08*     (2006.01)
    *H02K 7/116*     (2006.01)
    *H02K 11/215*     (2016.01)
    *H02K 21/14*     (2006.01)

(52) U.S. Cl.
    CPC ........... *H02K 7/116* (2013.01); *H02K 11/215* (2016.01); *H02K 21/14* (2013.01); *H02K 2207/03* (2013.01)

(56) References Cited

U.S. PATENT DOCUMENTS

| | | |
|---|---|---|
| 7,375,487 B2 | 5/2008 | Miyashita et al. |
| 8,159,096 B2 | 4/2012 | Tezuka et al. |
| 2012/0241281 A1* | 9/2012 | Franz .................... H02K 11/38 192/84.6 |
| 2014/0021832 A1 | 1/2014 | Palfenier et al. |
| 2018/0266530 A1 | 9/2018 | Alfano et al. |
| 2018/0287450 A1 | 10/2018 | Alfano et al. |
| 2021/0131555 A1 | 5/2021 | Ko et al. |
| 2022/0085692 A1 | 3/2022 | Tucker et al. |
| 2023/0198337 A1* | 6/2023 | Foucaut ................ F16H 57/023 74/421 A |

\* cited by examiner

GEAR MOTOR WITH GEARHEAD OUTPUT SHAFT POSITION FEEDBACK SYSTEM

BACKGROUND OF THE INVENTION a. Field of the Invention

This invention relates to gear motors. In particular, the invention relates to a gear motor including a system for accurately determining the position of the gear motor output shaft by minimizing the impact of gearhead backlash and protecting electronic components of the system from exposure to fluids and other potential contaminants.

b. Background Art

A conventional gear motor includes a motor having a motor shaft that drives a gearhead having a corresponding gearhead output shaft. For any particular speed of the motor, the gearhead enables an increase in torque as compared to the torque that can be generated by the motor alone. Depending on the application in which the gear motor is used, precise control of the gear motor is critical. For example, gear motors are commonly used in surgical tools where precise control is required for patient safety and successful procedural outcomes. Conventional control systems for gear motors will monitor the position of the motor shaft and/or the gearhead output shaft to ensure proper positioning of the shafts and operation of the device in which the gear motor is used. The location of the gearhead output shaft, however, creates difficulties for position monitoring. In particular, the gearhead output shaft drives the tool being used in the application and is therefore typically located in an area where space is limited and where there is greater risk of damage to components of the position monitoring system. For this reason, some gear motor control systems monitor the gearhead output shaft position indirectly by using motor shaft position information. These systems, however, can produce inaccurate position information regarding gearhead output shaft position due to flexsure of the motor shaft, gear backlash in the gearhead and/or component failure in the motor or geartrain. Gear motor control systems that monitor gearhead output shaft position directly produce more accurate information regarding gearhead output shaft position, but still often suffer from exposure to fluids and other contaminants. In surgical applications, for example, sensitive electronic components may be exposed to blood and other bodily fluids during use of a surgical tool, to surgical solutions used during operation of the tool (e.g., solutions used to clear a field of view near where the tool is being used) and to water, cleaning fluids and chemicals during cleaning and sterilization of the tool between uses of the tool.

The inventors herein have recognized a need for a gear motor that will minimize and/or eliminate one or more of the above-identified deficiencies.

BRIEF SUMMARY OF THE INVENTION

This invention relates to gear motors. In particular, the invention relates to a gear motor including a system for accurately determining the position of the gear motor output shaft by minimizing the impact of gearhead backlash and protecting electronic components of the system from exposure to fluids and other potential contaminants.

A gear motor in accordance with one embodiment includes a motor. The motor includes a housing including first and second endbells and a wall extending between the first and second endbells and defining a housing interior. The motor further includes a stator disposed within the housing interior and a rotor disposed within the housing interior and defining a tubular motor shaft extending through the first endbell of the housing. The motor shaft is disposed about a rotational axis and defines a through bore. The gear motor further includes a gearhead driven by the motor shaft and defining a gearhead output shaft coaxial with the motor shaft. The gear motor further includes a rod having a first end coupled to the gearhead output shaft and extending through the through bore in the motor shaft. The gear motor further includes a magnetized disc coupled to a second end of the rod opposite the first end of the rod. The magnetized disc is disposed within the housing interior. The gear motor further includes a gearhead output shaft position sensor configured to generate gearhead output shaft position signals responsive to rotation of the magnetized disc. The gearhead output shaft position sensor is disposed outside of the housing interior. In one embodiment, the magnetized disc and gearhead output shaft position sensor are disposed on opposite sides of the second endbell.

A gear motor in accordance with another embodiment includes a motor. The motor includes a housing including first and second endbells and a wall extending between the first and second endbells and defining a housing interior. The motor further includes a stator disposed within the housing interior and a rotor disposed within the housing interior and defining a tubular motor shaft extending through the first endbell of the housing. The motor shaft is disposed about a rotational axis and defines a through bore. The motor further includes a first bearing disposed within the first endbell and supporting the motor shaft, a second bearing disposed within the second endbell and supporting the motor shaft and a third bearing disposed within the second endbell. The gear motor further includes a gearhead driven by the motor shaft and defining a gearhead output shaft coaxial with the motor shaft. The gear motor further includes a rod having a first end coupled to the gearhead output shaft and extending through the through bore in the motor shaft. The gear motor further includes a magnetized disc coupled to a second end of the rod opposite the first end of the rod and a gearhead output shaft position sensor configured to generate gearhead output shaft position signals responsive to rotation of the magnetized disc. The third bearing is configured to support the second end of the rod.

A gear motor in accordance with another embodiment includes a motor. The motor includes a housing including first and second endbells and a wall extending between the first and second endbells and defining a housing interior. The motor further includes a stator disposed within the housing interior and a rotor disposed within the housing interior and defining a tubular motor shaft extending through the first endbell of the housing. The motor shaft is disposed about a rotational axis and defines a through bore. The motor further includes a first bearing disposed within the first endbell and supporting the motor shaft, a second bearing disposed within the second endbell and supporting the motor shaft and a third bearing disposed within the second endbell. The gear motor further includes a gearhead driven by the motor shaft and defining a gearhead output shaft coaxial with the motor shaft. The gear motor further includes a rod having a first end coupled to the gearhead output shaft and extending through the through bore in the motor shaft. The gear motor further includes a magnetized disc coupled to a second end of the rod opposite the first end of the rod. The magnetized disc is disposed within the housing interior. The gear motor further includes a gearhead output shaft position sensor configured to generate gearhead output shaft position signals responsive to rotation of the magnetized disc. The gearhead output shaft position sensor is disposed outside of the housing interior. The third bearing is configured to support the second end of the rod.

A gear motor in accordance with the present teachings represents an improvement as compared to conventional gear motors. In particular, the gear motor directly measures the position of the gearhead output shaft thereby providing more accurate measurement of the gearhead output shaft position and avoiding the impact of flexure of the motor shaft, gear backlash in the gearhead and/or component failure in the motor or geartrain. The gear motor also locates components of the position monitoring system away from the gearhead output shaft thereby avoiding space limitations in the area of the gearhead output shaft. Further, the gear motor locates electronic components of the position monitoring system in an area in which the components are protected from exposure to fluids and other contaminants.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
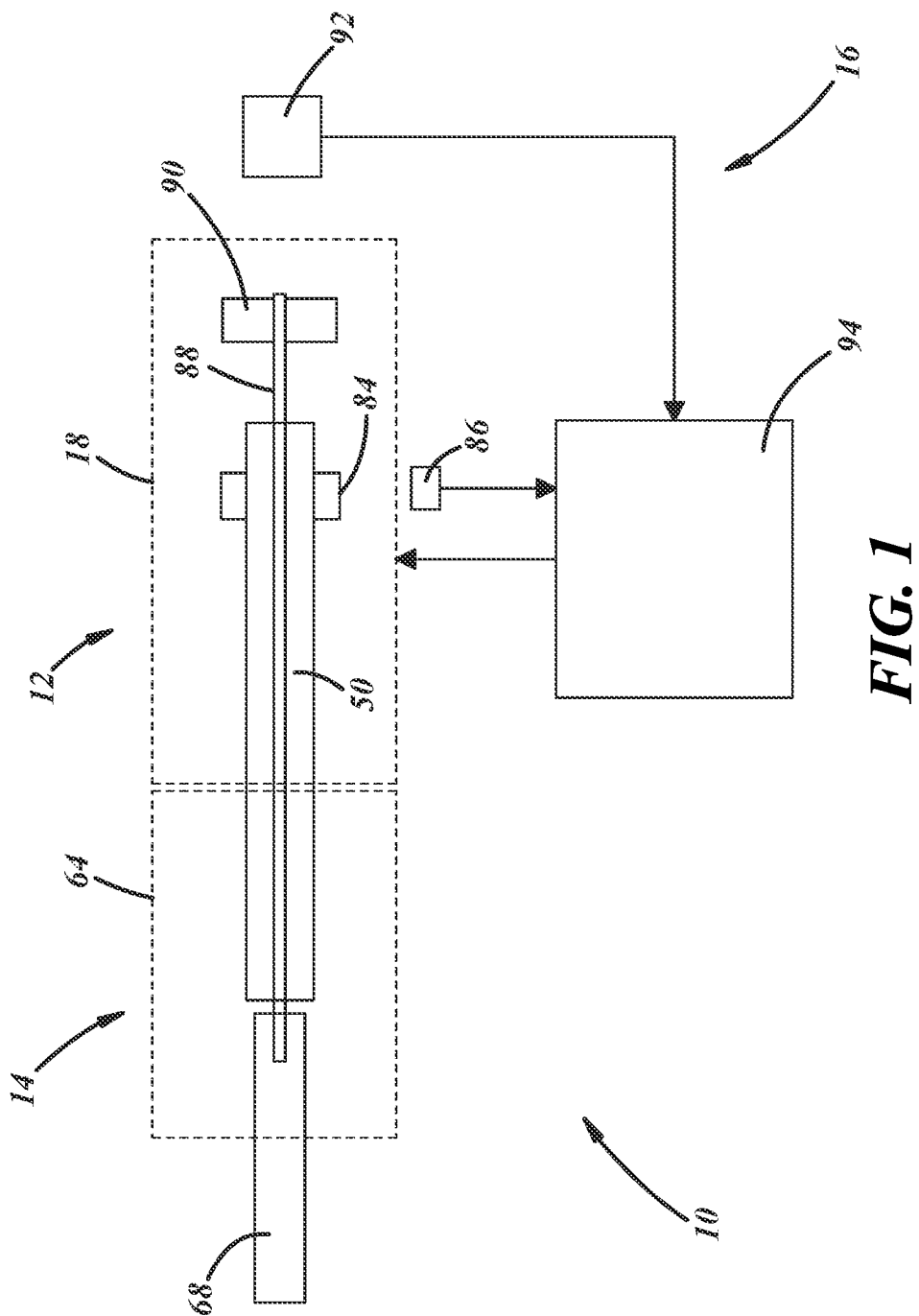
FIG. 1 is a diagrammatic view of a gear motor in accordance with the present teachings.

Referring now to the drawings wherein like reference numerals are used to identify identical components in the various views, FIG. 1 illustrate a gear motor 10 in accordance with the present teachings. Gear motor 10 may provide torque for use in a wide variety of applications including medical applications, robotics and industrial applications. In accordance with some embodiments, gear motor 10 is provide for use in powering a surgical tool. Gear motor 10 includes a motor 12, a gearhead 14 and a system 16 for controlling gear motor 10.

Figure 2:
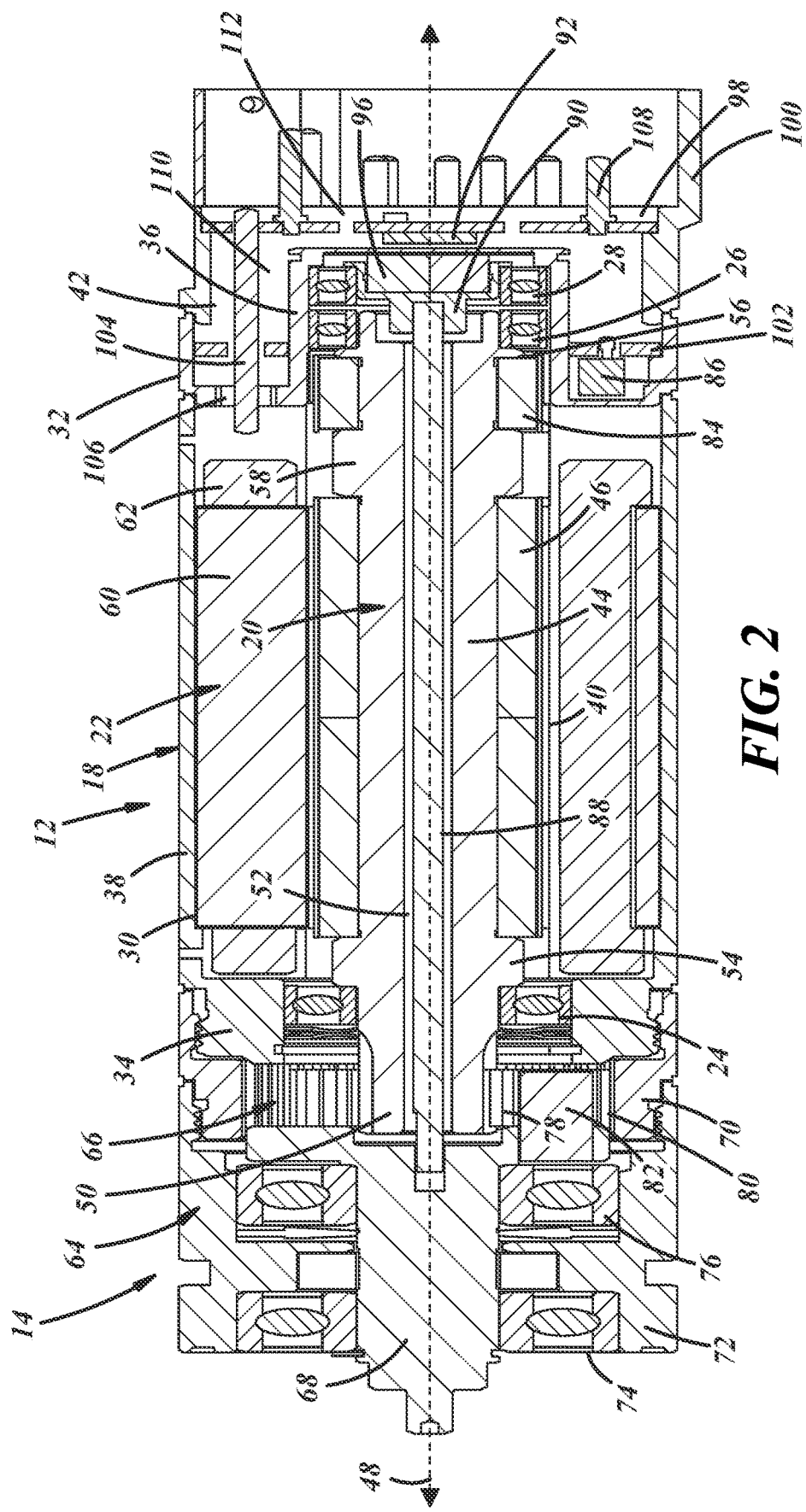
FIG. 2 is a cross-sectional view of one embodiment of a gear motor in accordance with the present teachings.

Motor 12 is provided to generate torque. Motor 12 may comprise a brushless DC (BLDC) motor. It should be understood, however, that motor 12 may assume other forms including a brushed DC motor, servo motor or permanent magnet synchronous motor. Referring now to FIG. 2, motor 12 may include a housing 18, a rotor assembly 20, a stator assembly 22, and bearings 24, 26, 28.

Housing 18 is provided to position and orient the components of motor 12 and to protect the components of motor 12 from foreign objects and elements. Housing 18 may include multiple members 30, 32 that may be joined using conventional fasteners such as welds. In the illustrated embodiment, members 30, 32 of housing 18 form endbells 34, 36 of housing 18 that are disposed at opposite ends of housing 18. Member 30 further forms a wall 38, which may be cylindrical in shape, extending from endbell 34 of member 30 to endbell 36 of member 32. The endbells 34, 36 and wall 38 together define a housing interior 40 or space within housing 18. Endbell 34 is sized to receive bearing 24 and defines a central aperture extending from the housing interior 40 to an exterior of housing 18. Endbell 36 is sized to receive bearings 26, 28 and defines one or more lead passages for a purpose described hereinbelow. A radially outer portion of member 32 extends rearwardly from endbell 36 to define a portion of a control module cavity 42 on an opposite side of endbell 36 from the housing interior 40.

Rotor assembly 20 outputs torque generated by motor 12. Assembly 20 may include a rotor 44 and a plurality of magnets 46 supported on rotor 44. Rotor 44 is disposed within housing interior 40. Rotor 44 is disposed about, and may be centered about, a rotational axis 48 and is configured for rotation about axis 48. Rotor 44 defines a motor shaft 50 that is supported proximate either longitudinal end of shaft 50 by bearings 24, 26, in endbells 34, 36 of housing 18. Shaft 50 extends through the central aperture in endbell 34 from the housing interior 40 to an exterior of housing 18 for connection to gearhead 14. In accordance with one aspect of the teachings disclosed herein, motor shaft 50 is tubular in shape and defines a through bore 52 extending along the entire axial length of shaft 50. Rotor 44 defines several radially outwardly extending flanges 54, 56, 58. Flange 54 is disposed proximate one axial end of rotor 44 and defines a shoulder configured to engage an inner race of bearing 24. Flange 56 is disposed proximate the other axial end of rotor 44 and defines a shoulder configured to engage an inner race of bearing 26. Flange 58 is disposed between flanges 54, 56. Magnets 46 are supported on a radially outer surface of rotor 44 between flanges 54, 58, on rotor 44. Magnets 46 comprise permanent magnets and are arranged about the outer circumference of rotor 44 to define a plurality of magnetic poles configured to interact with magnetic fields generated by stator assembly 22 to cause rotation of rotor assembly 20.

Stator assembly 22 is provided to generate electromagnetic fields to cause rotation of rotor assembly 20. Assembly 22 may include a stator 60 and conductors 62. Stator 60 is disposed within housing interior 40 and may comprise a plurality of stacked steel laminations that may define radially projecting teeth (not shown) about which conductors 62 may be wound. Stator 60 defines a central bore extending therethrough and configured to receive rotor assembly 20 therein. Conductors 62, such as coils, may be wound about stator 60 and may be wound in a manner to define one or more motor phases. In accordance with certain embodiments, the conductors 62 may be wound to form three motor phases. The motor phases are selectively and sequentially activated to generate electromagnetic fields and cause rotation of rotor assembly 20.

Bearings 24, 26, 28 may each be disposed about, and centered about, axis 48. Bearing 24 is configured to be received within endbell 34 and to support a forward end of motor shaft 50. An inner race of bearing 24 engages a shoulder formed by flange 54 on rotor 44. Bearing 26 is configured to be received within endbell 36 and to support a rearward end of motor shaft 50. An inner race of bearing 26 engages a shoulder formed by flange 56 on rotor 44. Bearing 28 is also configured to be received within endbell 36 and supports a component of system 16 as described in greater detail below. Bearing 28 is adjacent to bearing 26 and aligned with bearing 26. The inner diameter of bearing 28 may be equal to the inner diameter of bearing 26. Likewise, the outer diameter of bearing 28 may be equal to the outer diameter of bearing 26.

Referring again to FIG. 1, gearhead 14 increases the torque generated by motor 12 at a given motor speed (thereby enabling the provision of increase torque or a reduction in motor speed depending on the application).

Referring again to FIG. 2, gearhead 14 may include a housing 64, a gear arrangement 66 and a gearhead output shaft 68.

Housing 64 is provided to position and orient the components of gearhead 14 and to protect the components of gearhead 14 from foreign objects and elements. Housing 64 may include multiple members 70, 72 that may be joined using conventional fasteners such as welds. Further, housing 64 may be joined to motor housing 18 using conventional fasteners such as welds. Member 70 is configured to receive gear arrangement 66 therein and radially inner surface of member 70 may define a ring gear of gear arrangement 66. Member 72 defines a central aperture that is disposed about, and be centered about axis 48 and that is configured to receive gearhead output shaft 68. Member 72 is further configured to receive bearings 74, 76 proximate either axial end of member 72 to support gearhead output shaft 68 for rotation relative to housing 64.

Gear arrangement 66 is provided to transfer, and increase, the torque generated by motor shaft 50 to gearhead output shaft 68. Arrangement 66 may comprise a planetary gear set including a sun gear 78, a ring gear 80, and a plurality of planetary gears 82. Sun gear 78 may be disposed about a forward end of motor shaft 50. Sun gear 78 may be coupled to motor shaft 50 for rotation with motor shaft 50 through a conventional spline connection. It should be understood, however, that sun gear 78 may be coupled to motor shaft 50 by other means (e.g., key and keyway). Ring gear 80 is disposed radially outwardly of sun gear 78. As noted above, ring gear 80 may be formed in a radially inner surface of housing member 70. Alternatively, ring gear 80 may be a separate structure that is coupled to housing member 70 and fixed against rotation. Planetary gears 82 are disposed radially between, and in mesh with, sun gear 78 and ring gear 80. Planetary gears 82 are supported on axial extensions of gearhead output shaft 68. As a result, rotation of motor shaft 50 and sun gear 78 causes corresponding rotation of planetary gears 82 and gearhead output shaft 68.

Gearhead output shaft 68 transfers torque to a tool or similar device. Shaft 68 is disposed about, and may be centered about, axis 48 and is coaxial with motor shaft 50. Shaft 68 extends through, and outward from housing 64 and is supported for rotation relative to housing 64 by bearings 74, 76. Shaft 68 is configured to support a tool (e.g., a shaver for removal of body tissues) or similar device at one axial end of shaft 68. The opposite axial end of shaft 68 is configured to support planetary gears 82 in gear arrangement 66. In accordance with one aspect of the present teachings, the same end may further define means for coupling shaft 68 to a component of system 16 as described in greater detail below.

Referring again to FIG. 1, system 16 is provides a means for controlling gear motor 10. System 16 may include means, such as magnets 84 and one or more position sensors 86 for determining the position of motor shaft 50 of motor 12, and means, such as rod 88, magnetized disc 90 and position sensor 92, for determining the position of gearhead output shaft 68. System 16 may further include a controller 94 configured to control delivery of current to conductors 62 of stator assembly 22 and, as a result, activation of each motor phase to control the generation of electromagnetic fields by stator assembly 22 and operation of gear motor 10.

Figure 3:
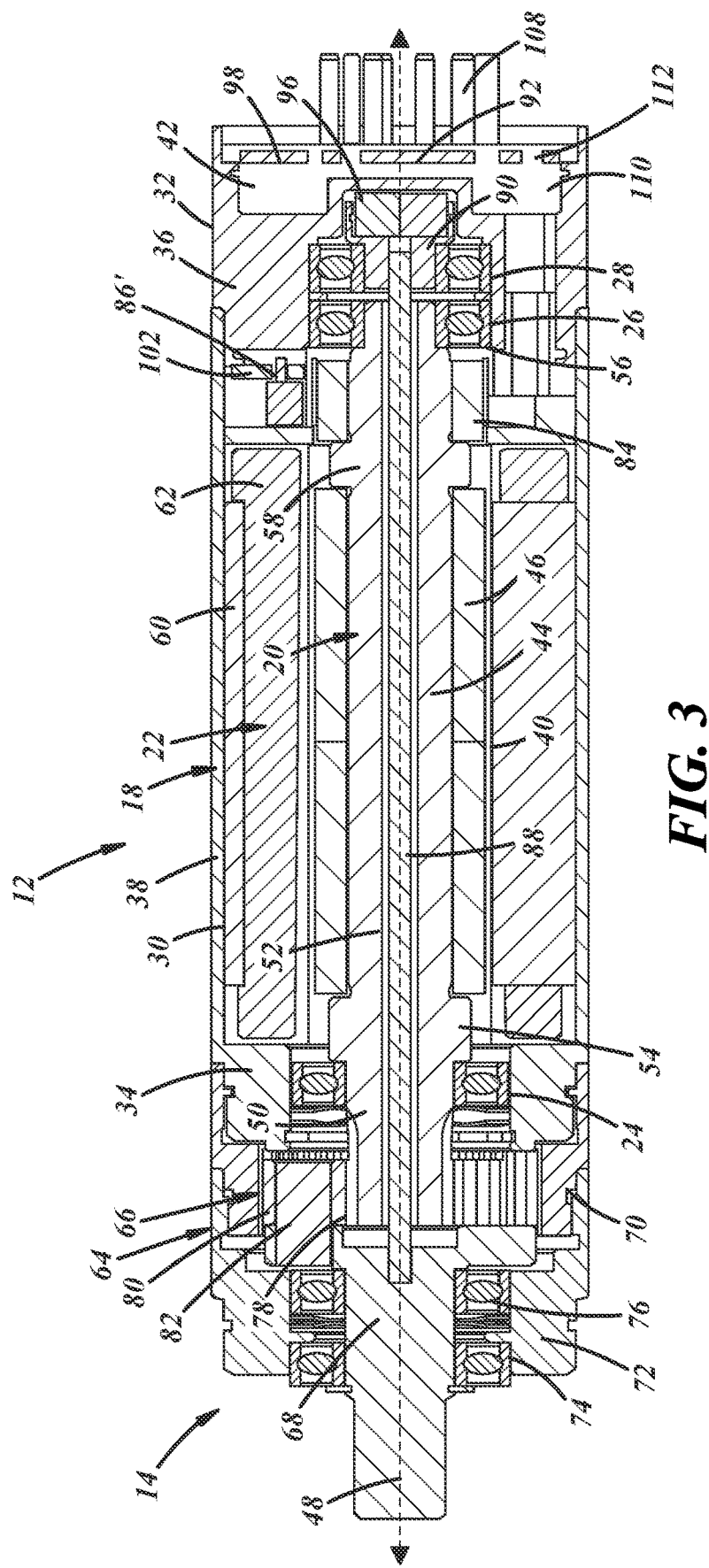
FIG. 3 is a cross-sectional view of another embodiment of a gear motor in accordance with the present teachings.

Referring again to FIG. 2, magnets 84 and position sensor 86 provide a means for determining the position of motor shaft 50. Magnets 84 may be supported on rotor 44 between flanges 56, 58 on rotor 44. Position sensor 86 is configured to generate signals responsive to changes in a magnetic field as magnets 84 rotates about axis 48 with motor shaft 50. Sensor 86 may comprise a Hall effect sensor or a magneto-resistive sensor. In the illustrated embodiment, sensor 86 is disposed outside of housing 18 and, therefore, is not within housing interior 40. In particular, magnets 84 and sensor 86 are disposed on opposite sides of endbell 36 of housing 18 with magnets 84 disposed within housing interior 40 and sensor 86 disposed within control module cavity 42. As a result, sensor 86 is better protected from fluids and related contaminants that may be encountered by gear motor 10 during operation of gear motor 10 (e.g., blood and other bodily fluids in surgical applications) and during cleaning or sterilization of gear motor 10 between uses. Seals (not shown) proximate bearings 74, 76 in gearhead 14 and bearing 24 in motor 12 are subject to wear and occasional failure and the failure of the seals can establish a pathway for fluids and contaminants to travel through motor 12 along unencapsulated pathways such as between stator assembly 22 and rotor assembly 20. Referring to FIG. 3 (where like reference numbers are used to identify similar components to the embodiment shown in FIG. 2), in certain alternative embodiments, a sensor 86' may be nevertheless be disposed within the housing interior 40 and on the same side of endbell 36 as magnets 84.

Referring again to FIG. 2, rod 88, magnetized disc 90 and position sensor 92 provide a means for determining the position of gearhead output shaft 68. Rod 88 is disposed about, and may be centered about, axis 48 and extends through bore 52 in motor shaft 50. One axial end of rod 88 is coupled to gearhead output shaft 68 while the other axial end of rod 88 is coupled to and supports disc 90. Rod 88 may be coupled to gearhead output shaft 68 in a variety of ways including through a spline connection, key and keyway, or lug/notch arrangement. Rod 88 may also be coupled to gearhead output shaft 68 by forming rod 88 and gearhead output shaft 68 as a unitary (one piece) structure. Rod 88 may be coupled to disc 90 in similar ways. In the illustrated embodiment the axial ends of rod 88 extend into closed bores formed in gearhead output shaft 68 and disc 90. Disc 90 is supported on, and configured for rotation with, rod 88. Disc 90 includes a plurality of magnets 96. Disc 90 is sized to be received within bearing 28 and a radially outwardly extending flange at one axial end of disc 90 defines a shoulder configured to engage an inner race of bearing 28. Because the bearing 26 supporting motor shaft 50 and the bearing 28 supporting rod 88 are both disposed within endbell 36, the concentricity of shaft 50 and rod 88 may be better maintained. Position sensor 92 is configured to generate signals responsive to changes in a magnetic field as disc 90 and magnets 96 rotate about axis 48 with rod 88 and gearhead output shaft 68. Sensor 92 may comprise a Hall effect sensor or magneto-resistive sensor. In accordance with one aspect of the invention, sensor 92 may be disposed outside of housing 18 and, therefore, is not within housing interior 40. In particular, magnets 96 and sensor 92 are disposed on opposite sides of endbell 36 of housing 18 with sensor 92 disposed in control module cavity 42. As a result, sensor 92 is better protected from fluids and related contaminants that may be encountered by gear motor 10 during operation of gear motor 10 (e.g., blood and other bodily fluids in surgical applications) and during cleaning or sterilization of gear motor 10 between uses.

Referring again to FIG. 1, controller 94 controls delivery of current to conductors 62 of stator assembly 22 in motor 12 and, as a result, activation of each motor phase to control the generation of electromagnetic fields by stator assembly 22 and operation of gear motor 10. Controller 94 may comprise a programmable microprocessor or microcontroller or may comprise an application specific integrated circuit (ASIC). Controller 94 may include a memory, a central processing unit (CPU), and an input/output (I/O) interface including a plurality of input/output pins or terminals through which controller 94 may receive a plurality of input signals and transmit a plurality of output signals. The input signals may include signals from position sensors 86, 92. The output signals may include control signals for switches and other circuit elements used to control the delivery of current to conductors 62 in stator assembly 22. Referring to FIG. 2, controller 94 and related circuit elements may be mounted on a printed circuit board 98 supported within a housing 100 that may be affixed to member 32 of motor housing 18 to extend control module cavity 42. The outer diameter of housing 100 and, therefore, control module cavity 42, may be less than or equal to the outer diameter of motor housing 18 and housing interior 40 such that system 16 is within the outer diameter of motor 12. Controller 94 and related circuit elements are therefore located outside of housing interior 40. Position sensor 92 may also be mounted on board 98 while position sensor 86 may be mounted on a separate board 102. Stator leads 104 may extend from board 98 in one axial direction through board 102 and through lead passages in endbell 36 for connection to conductors 62 on stator assembly 22. A glass seal 106 or other seal may be disposed about stator leads 104 to seal control module cavity 42 from housing interior 40. External leads 108 for supplying power or other electrical signals may extend from board 98 in the opposite axial direction relative to stator leads 104. An encapsulating material 110 may be used to encapsulate the electronic components of system 16 including sensors 86, 92, controller 94 and the boards 98, 102 on which these components are mounted and hermetically seal the components. Boards 98, 102 may include bores 112 through which material 110 may flow during the encapsulation process.

A gear motor 10 in accordance with the present teachings represents an improvement as compared to conventional gear motors. In particular, the gear motor 10 directly measures the position of the gearhead output shaft 68 thereby providing more accurate measurement of the gearhead output shaft position and avoiding the impact of flexure of the motor shaft 50, gear backlash in the gearhead 14 and/or component failure in the motor or geartrain. The gear motor 10 also locates the components of the position monitoring system 16 away from the gearhead output shaft 68 thereby avoiding space limitations in the area of the gearhead output shaft 68. Further, the gear motor 10 locates electronic components of the position monitoring system 16 in an area in which the components are protected from exposure to fluids and other contaminants.

While the invention has been shown and described with reference to one or more particular embodiments thereof, it will be understood by those of skill in the art that various changes and modifications can be made without departing from the spirit and scope of the invention.

What is claimed is:

1. A gear motor, comprising:
 a motor including a housing including first and second endbells and a wall extending between the first and second endbells and defining a housing interior;
 a stator disposed within the housing interior;
 a rotor disposed within the housing interior and defining a tubular motor shaft extending through the first endbell of the housing, the motor shaft disposed about a rotational axis and defining a through bore;
 a first bearing disposed within the first endbell and supporting the motor shaft;
 a second bearing disposed within the second endbell and supporting the motor shaft; and,
 a third bearing disposed within the second endbell;
 a gearhead driven by the motor shaft and defining a gearhead output shaft coaxial with the motor shaft;
 a rod having a first end coupled to the gearhead output shaft and extending through the through bore in the motor shaft;
 a magnetized disc coupled to a second end of the rod opposite the first end of the rod; and,
 a gearhead output shaft position sensor configured to generate gearhead output shaft position signals responsive to rotation of the magnetized disc
 wherein the third bearing is configured to support the second end of the rod.

2. The gear motor of claim 1 wherein an inner diameter of the third bearing is identical to an inner diameter of the second bearing.

3. The gear motor of claim 2 wherein an outer diameter of the third bearing is identical to an outer diameter of the second bearing.

4. The gear motor of claim 1 wherein an outer diameter of the third bearing is identical to an outer diameter of the second bearing.

5. The gear motor of claim 1 wherein the third bearing engages the magnetized disc.

6. A gear motor, comprising:
 a motor including
 a housing including first and second endbells and a wall extending between the first and second endbells and defining a housing interior;
 a stator disposed within the housing interior;
 a rotor disposed within the housing interior and defining a tubular motor shaft extending through the first endbell of the housing, the motor shaft disposed about a rotational axis and defining a through bore;
 a first bearing disposed within the first endbell and supporting the motor shaft;
 a second bearing disposed within the second endbell and supporting the motor shaft; and,
 a third bearing disposed within the second endbell;
 a gearhead driven by the motor shaft and defining a gearhead output shaft coaxial with the motor shaft;
 a rod having a first end coupled to the gearhead output shaft and extending through the through bore in the motor shaft;
 a magnetized disc coupled to a second end of the rod opposite the first end of the rod, the magnetized disc disposed within the housing interior; and,
 a gearhead output shaft position sensor configured to generate gearhead output shaft position signals responsive to rotation of the magnetized disc, the gearhead output shaft position sensor disposed outside of the housing interior
 wherein the third bearing is configured to support the second end of the rod.

7. The gear motor of claim 6 wherein the magnetized disc and the gearhead output shaft position sensor are disposed on opposite sides of the second endbell.

8. The gear motor of claim 6, further comprising:
 a magnet supported on the motor shaft and configured for rotation with the motor shaft; and, a motor shaft position sensor configured to generate motor shaft position signals responsive to rotation of the magnet, the motor shaft position sensor disposed within the housing interior.

9. The gear motor of claim 6, further comprising:
a magnet supported on the motor shaft and configured for rotation with the motor shaft; and,
a motor shaft position sensor configured to generate motor shaft position signals responsive to rotation of the magnet, the motor shaft position sensor disposed outside of the housing interior.

10. The gear motor of claim 9 wherein the magnet and the motor shaft position sensor are disposed on opposite sides of the second endbell.

11. The gear motor of claim 6 wherein an inner diameter of the third bearing is identical to an inner diameter of the second bearing.

12. The gear motor of claim 11 wherein an outer diameter of the third bearing is identical to an outer diameter of the second bearing.

13. The gear motor of claim 6 wherein an outer diameter of the third bearing is identical to an outer diameter of the second bearing.

14. The gear motor of claim 6 wherein the third bearing engages the magnetized disc.

15. A gear motor, comprising:
a motor including
a housing including first and second endbells and a wall extending between the first and second endbells and defining a housing interior;
a stator disposed within the housing interior;
a rotor disposed within the housing interior and defining a tubular motor shaft extending through the first endbell of the housing, the motor shaft disposed about a rotational axis and defining a through bore;
a first bearing disposed within the first endbell and supporting the motor shaft;
a second bearing disposed within the second endbell and supporting the motor shaft; and,
a third bearing disposed within the second endbell;
a gearhead driven by the motor shaft and defining a gearhead output shaft coaxial with the motor shaft;
a rod having a first end coupled to the gearhead output shaft and extending through the through bore in the motor shaft;
a magnetized disc coupled to a second end of the rod opposite the first end of the rod; and,
a gearhead output shaft position sensor configured to generate gearhead output shaft position signals responsive to rotation of the magnetized disc wherein the third bearing is axially adjacent to the second bearing and configured to support the second end of the rod.

16. The gear motor of claim 15 wherein an outer race of the second bearing and an outer race of the third bearing engage a common surface of the second endbell.

17. The gear motor of claim 15 wherein a first side of an inner race of the second bearing facing away from the third bearing engages a shoulder formed in the motor shaft and a first side of an inner race of the third bearing facing away from the second bearing engages a shoulder formed in the magnetized disc.

18. The gear motor of claim 15 wherein the magnetized disc is disposed within the housing interior and the gearhead output shaft position sensor is disposed outside of the housing interior.

19. The gear motor of claim 15 wherein an inner diameter of the third bearing is identical to an inner diameter of the second bearing.

20. The gear motor of claim 15 wherein an outer diameter of the third bearing is identical to an outer diameter of the second bearing.

21. The gear motor of claim 15 wherein the third bearing engages the magnetized disc.

22. The gear motor of claim 15, further comprising:
a magnet supported on the motor shaft and configured for rotation with the motor shaft; and,
a motor shaft position sensor configured to generate motor shaft position signals responsive to rotation of the magnet, the motor shaft position sensor disposed within the housing interior.

23. The gear motor of claim 21, further comprising:
a magnet supported on the motor shaft and configured for rotation with the motor shaft; and,
a motor shaft position sensor configured to generate motor shaft position signals responsive to rotation of the magnet, the motor shaft position sensor disposed outside of the housing interior.

24. The gear motor of claim 23 wherein the magnet and the motor shaft position sensor are disposed on opposite sides of the second endbell.

25. The gear motor of claim 15 wherein the gearhead includes:
a ring gear coupled to the gearhead output shaft;
a sun gear coupled to the motor shaft; and,
a plurality of planet gears disposed between the sun gear and the ring gear.

* * * * *